Dec. 20, 1960     C. H. JAY     2,965,313

SHOWER HEAD CONTROL VALVE

Filed Dec. 22, 1955

INVENTOR.
CHARLES H. JAY
BY Robert K. Youtie
ATTORNEY

United States Patent Office 2,965,313
Patented Dec. 20, 1960

2,965,313
SHOWER HEAD CONTROL VALVE

Charles H. Jay, 7848 Bayard Road, Philadelphia, Pa.

Filed Dec. 22, 1955, Ser. No. 554,689

2 Claims. (Cl. 239—569)

This invention relates generally to improvements in shower bath systems, and is particularly directed to a novel valve construction for use in conjunction with a shower bath.

As is well known, shower bath constructions conventionally include a mixing conduit or pipe connected at one end to independently valved hot and cold water supply lines, and connected at its other end to a shower head. In use, regulation or adjustment of the water temperature and rate of flow from the head are both interdependently controlled by the supply line valves. As it is usually necessary for the operator's person to be in contact with the flowing water during regulation thereof, in order to ascertain when the desired conditions have been reached, shower bathers are often burned or shocked by water flow of unexpected temperatures and quantities. This problem is also present after the shower water has been turned off, say to enable the bather to apply soap, and when it is desired to resume flow of the shower water, as for rinsing. For this reason, many shower bathers do not turn the shower water off during the application of soap, which wastes a considerable quantity of water and reduces the efficiency of lathering.

Accordingly, it is a general object of the present invention to provide a device for use in shower systems which overcomes the above mentioned difficulties, obviates the danger of burns or shock during regulation of the water temperature and rate of flow, and which permits a bather to quickly and easily adjust the water temperature and rate of flow to the desired conditions from either inside or outside of the shower, without subjecting his person to dangerous contact with relatively hot or cold water.

It is another object of the present invention to provide a device for use in shower systems which enables a bather to regulate or adjust the water temperature and rate of flow without wasting water, and wherein the shower water once regulated may be turned on, substantially off, or to any desired rate of flow by a simple, single manual movement, without appreciable change in water temperature. Hence, by the instant device, a bather may turn the temperature regulated water off or substantially off for any desired period, say long enough to permit effective application of soap, and subsequently turn the shower water on to the desired rate and the same temperature by a single manipulation.

It is a further object of the present invention to provide a device for use in conjunction with a hot and cold water shower system having the advantageous characteristics mentioned in the foregoing paragraphs, which is extremely simple in construction and durable in use, neat and attractive in appearance, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 4:
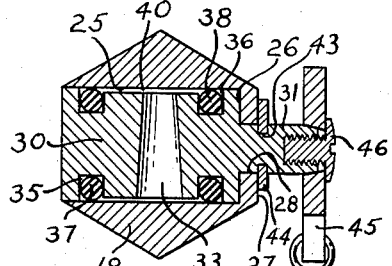
Figure 4 is a transverse sectional view taken substantially along the line 4—4 of Figure 3.

Referring now more particularly to the drawings, and specifically to Figures 1–4 thereof, the embodiment of the invention illustrated therein includes a vertical hot and cold water mixing conduit or pipe 10 which is conventionally disposed interiorly of a wall, as at 11, and having its upper end bent as at 12 to receive a goose neck 13 to which the shower head 16 is, conventionally, directly secured. According to my invention, the control valve 15 is interposed between the goose neck and the shower head as clearly shown in Fig. 1.

The control valve 15 of my invention includes a casing 18 formed with tapered, longitudinally extending, open-ended passages 19 and 23, with the large end of passage 18 communicating with an internally threaded recess 20 which is secured to the end of the goose neck, and with the small end of opening 23 communicating with the interior of an externally threaded nipple 21 to which the shower head is secured. It will be noted that the opposite ends of passages 19 and 23 are of smaller diameters than the diameters of the goose neck 13 and nipple 21, respectively.

Valve casing 18 is also provided with a cylindrical bore 25 for receiving valve plug 30, the stem 31 of which projects through an opening 28 formed in side wall 27 of the casing. As will be seen from Figs. 3 and 4, valve plug 30 is cylindrical and is rotatable within bore 25 by means of a handle 45 engaging valve stem 31 as best shown in Fig. 4.

Figure 3:
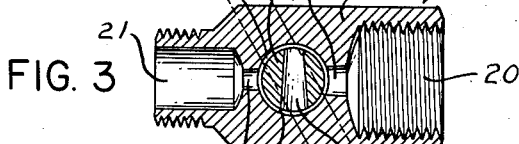
Figure 3 is a longitudinal sectional view similar to Figure 2, but showing the valve removed from the system and illustrating a closed valve condition.

Valve plug 30 is provided with a through bore 33 which is arranged to register with the adjacent portions of flow passages 19 and 23 in open position thereof. Further, port 33 is tapered from one end to the other end thereof, so as to combine with the adjacent passages 19 and 23 to define a continuously tapering bore or passageway when the plug is in its open position as shown in Fig. 3.

Formed in the external surface of the plug 30, adjacent to and spaced inwardly from its opposite ends, are a pair of outwardly opening peripheral grooves or recesses 35 and 36 which receive annular sealing members or O-rings 37 and 38 respectively. It will be noted that the diameter of the plug 30 between the grooves 35 and 36, is of slightly less diameter than the bore 25 to provide a clearance 40 between the internal surface of bore 25 and the external surface of the plug. The end portions of the plug 30, beyond the grooves 35 and 36, may be of substantially the same external diameter as the internal diameter of bore 25 so as to engage with the latter and rotatably support the plug with its reduced central portion concentric with the bore 25.

The laterally projecting stem 31 is preferably externally grooved, as at 43, for receiving a snap-on type retainer 44 which bears against the casing side 27 to retain the plug in proper relation relative to casing 18 while permitting easy rotation of the plug.

The actuating member, handle 45 is nonrotatably mounted intermediate its ends on the projecting end of the stem 31 and detachably fixed on the latter by a suitable fastener 46. A pair of pull chains 47 and 48, are connected to opposite ends, respectively, of handle 45 to facilitate manual rotation of handle and valve plug 30. In the embodiment of Figures 1–4, the plug stem 31 is illustrated as extending generally horizontally from the valve casing 18, and handle 45 as being on one side of the valve casing and rotatable about the generally horizontal axis of the plug 30 and plug stem.

Figure 2:
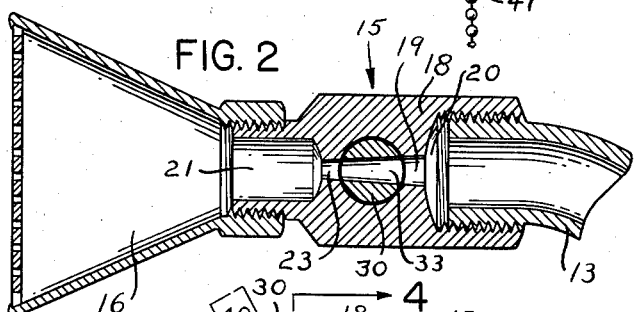
Figure 2 is a partial, longitudinal sectional view taken substantially along the line 2—2 of Figure 1.

In order to operate the valve 15 it is only necessary to swing handle 45, as by manually pulling chain 47 or 48, to rotate plug 30 between the position of Figure 2 wherein the port 33 is in registry with the fluid passages 19 and 23 and closed position of Figure 3 in which port 33 is out of registry with the fluid passages 19 and 23 in all positions of plug 30 a limited flow of mixed hot and cold water is permitted to pass through space 40 between the plug 30 and the interior surface of bore 25.

In operation, the desired water temperature in the mixing conduit 10 may be obtained by adjusting the hot and cold water supply line valves in the conventional manner, and plug 30 may be rotated to a selected open position affording the desired rate of water flow. In its fully open position of Figure 2, the continuously tapering passageway defined by the port 33 and adjacent passages 19 and 23 serve to increase the velocity of water passing therethrough, in the manner of a venturi, for more satisfactory shower performance.

If the bather desires to turn the shower off temporarily, say long enough to apply soap, it is only necessary to pull chain 47 or 48 to rotate the plug 30 to its closed position with the port 33 out of registry with the passageway 19. The slight flow of temperature regulated water permitted through the closed valve, prevents the relatively hot water from the hot water supply line from displacing the cold water from the upper portion of the cold water pipe, which will otherwise take place to the injury, or shock of a bather when he again opens the control valve.

Figure 5:
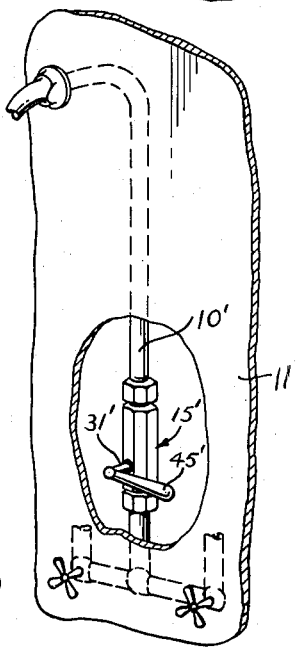
Figure 5 is a partial perspective view showing a slightly modified shower system constructed in accordance with the present invention.

In Figure 5 there is shown a slight modification of the present invention, wherein a valve 15', similar in construction to the valve 15, is connected intermediate the ends of and in series with a mixing conduit 10' rather than between the conduit and shower head. Except for being located interiorly of the wall 11 and being provided with a manually actuable knob or handle 45' disposed exteriorly of the wall, the operation of the device of Figure 5 is substantially the same as that described hereinbefore in connection with Figures 1–4.

Figure 1:
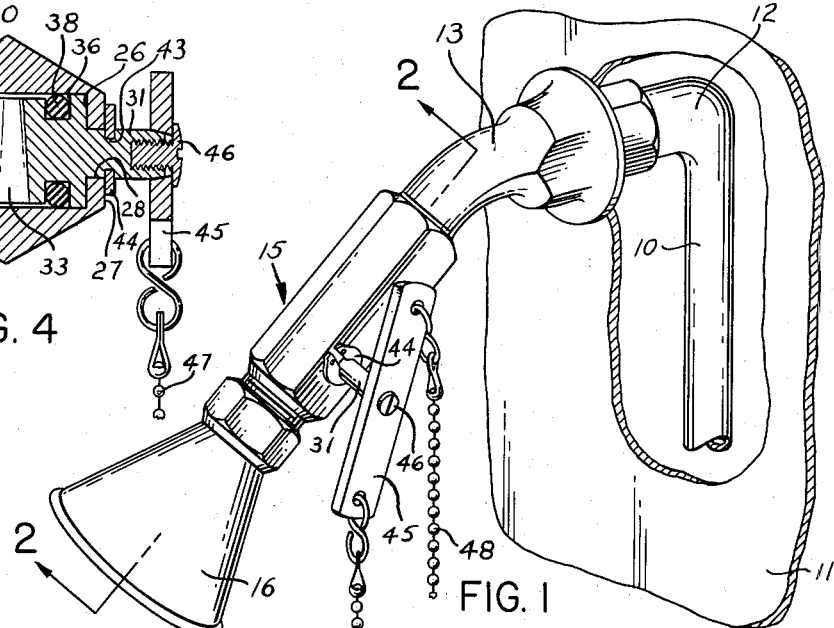
Figure 1 is a partial, perspective view showing a shower system constructed in accordance with the present invention, partly broken away for clarity of understanding.
Figure 6:
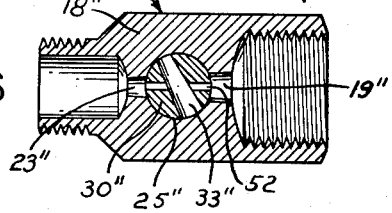
Figure 6 is a longitudinal sectional view showing a slightly modified valve of the present invention.

Another slight modification of the instant invention is illustrated in Figure 6, wherein the valve casing 18" is substantially identical with the valve casing 18 described hereinbefore. However, the plug 30" is additionally provided with a transversely extending, relatively small through bore 52 which is preferably disposed obliquely to and intersects with the tapered port 33" corresponding to the port 33. In this embodiment, the plug 30" need not have its intermediate portion reduced in diameter, because, when plug 30" is in its fully closed position, bore 52 connects passages 19" and 23" to permit the slight leak which in the embodiment of Fig. 1 is effected by space 40. It will be noted that in the embodiment of Fig. 6, the valve plug can be rotated to a position in which neither passage 33" nor bore 52 will connect passages 19" and 23" in which position the valve will be tightly closed and there will be no leak.

What is claimed is:

1. In combination, a mixing conduit connected at one end thereof to sources of hot and cold water, a valve casing detachably connected at one end thereof to the other end of said conduit, a shower head detachably connected to the other end of said casing, there being a first tapered passage (19) in one end of said casing with the large end of said first passage adjacent the end of said conduit, and a second tapered passage (23) in the opposite end of said casing with the small end of said second passage adjacent the shower head; a valve plug rotatable in said casing and having a third tapered passage (33) therethrough with the large end of said tapered passage adapted to register with the small end of said first passage and with the small end of said third passage adapted to register with the large end of said second passage, and means for rotating said plug to a first position in which said third passage fully registers with said first and second passages to provide a continually tapering opening leading from said mixing conduit to said shower head and to a second position in which said third passage is wholly out of registration with said first and second passages, a portion of said plug intermediate the ends thereof, being of a smaller diameter than the internal diameter of the corresponding portion of the casing whereby a limited amount of water will flow past said valve plug even when said plug is in its second position, said valve being also rotatable to other positions intermediate said first and second positions.

2. The structure recited in claim 1 and a fourth passage (52) formed through said plug and so angularly disposed with reference to said third passage that when said plug is in its second position, said fourth passage connects said first and second passages and that in an intermediate position of said plug, both of said third and fourth passages are out of registration with both of said first and second passages.

References Cited in the file of this patent

UNITED STATES PATENTS

| | | |
|---|---|---|
| 421,224 | Applegarth | Feb. 11, 1890 |
| 511,728 | Deming | Dec. 26, 1893 |
| 2,124,359 | Weisgerber | July 19, 1938 |
| 2,247,310 | Rockwood | June 24, 1941 |
| 2,583,232 | Russell | Jan. 22, 1952 |
| 2,604,293 | Phillips | July 22, 1952 |